(12) United States Patent
Haramaty et al.

(10) Patent No.: US 10,079,782 B2
(45) Date of Patent: Sep. 18, 2018

(54) FACILITATING COMMUNICATION OF DATA PACKETS USING CREDIT-BASED FLOW CONTROL

(71) Applicant: Mellanox Technologies TLV Ltd., Raanana (IL)

(72) Inventors: Zachy Haramaty, Hemed (IL); Ran Ravid, Tel Aviv (IL); Oded Wertheim, Zichron Yaakov (IL)

(73) Assignee: Mellanox Technologies TLV Ltd., Raanana (IL)

( * ) Notice: Subject to any disclaimer, the term of this patent is extended or adjusted under 35 U.S.C. 154(b) by 155 days.

(21) Appl. No.: 15/086,990

(22) Filed: Mar. 31, 2016

(65) Prior Publication Data

US 2017/0289066 A1 Oct. 5, 2017

(51) Int. Cl.
*H04L 12/939* (2013.01)
*H04L 12/835* (2013.01)
*H04L 12/807* (2013.01)
*H04L 12/825* (2013.01)

(52) U.S. Cl.
CPC .......... *H04L 49/552* (2013.01); *H04L 47/263* (2013.01); *H04L 47/27* (2013.01); *H04L 47/30* (2013.01)

(58) Field of Classification Search
CPC ................. H04L 47/10; H04L 12/5602; H04L 2012/5636; H04L 2012/5632; H04Q 11/0478
See application file for complete search history.

(56) References Cited

U.S. PATENT DOCUMENTS

| | | | | |
|---|---|---|---|---|
| 6,002,667 A | * | 12/1999 | Manning | G06F 15/17375 370/232 |
| 6,044,406 A | * | 3/2000 | Barkey | H04Q 11/0478 370/231 |
| 6,088,736 A | * | 7/2000 | Manning | G06F 15/17375 370/235 |

(Continued)

OTHER PUBLICATIONS

Kung, H. T. et al. "The FCVC (Flow-Controlled Virtual Channels) Proposal for ATM Networks: A Summary." Proceedings of the 1993 International Conference on Network Protocols, Oct. 19-22, 1993, pp. 116-127.

(Continued)

*Primary Examiner* — Mark Rinehart
*Assistant Examiner* — Sanjay K Dewan
(74) *Attorney, Agent, or Firm* — Alston & Bird LLP (57) ABSTRACT

Apparatuses and methods are described that provide for credit based flow control in a network in which a public buffer is supported at a receiver node, where a transmitter node can control the use of the public buffer. In particular, the transmitter node determines a buffer credit value (TCRi) for each virtual lane of the transmitter node. The buffer credit value (TCRi) is negative (e.g., less than 0) in an instance in which a respective virtual lane private buffer is fully used and thus reflects a loan of credits from the public buffer. In addition, the transmitter node knows the needed buffer size per virtual lane for transmitting a packet in advance based on the round trip time (RTT) and maximum transmission unit (MTU) for the packet and is precluded from consuming more space on the public buffer than required to meet RTT.

17 Claims, 3 Drawing Sheets

(56) References Cited

U.S. PATENT DOCUMENTS

| | | | | |
|---|---|---|---|---|
| 6,922,408 B2* | 7/2005 | Bloch | ............... | H04L 12/4604 370/389 |
| 6,954,424 B2* | 10/2005 | Barrack | ............... | H04L 47/10 370/229 |
| 7,085,846 B2* | 8/2006 | Jenne | ............... | H04L 47/10 370/231 |
| 7,190,667 B2* | 3/2007 | Susnow | ............... | H04L 47/10 370/229 |
| 7,441,142 B2* | 10/2008 | Kakizaki | ............... | H04L 47/10 709/217 |
| 7,787,367 B2* | 8/2010 | Gusat | ............... | H04L 1/1874 370/229 |
| 7,821,939 B2* | 10/2010 | DeCusatis | ............... | H04L 47/10 370/229 |
| 8,238,361 B2* | 8/2012 | Carlsson | ............... | H04L 47/10 370/232 |
| 8,989,011 B2 | 3/2015 | Ravid et al. | | |
| 8,995,265 B2* | 3/2015 | Basso | ............... | H04L 47/56 370/232 |
| 2006/0153078 A1* | 7/2006 | Yasui | ............... | G06F 13/385 370/235 |
| 2007/0053350 A1* | 3/2007 | Spink | ............... | H04L 47/527 370/381 |
| 2009/0010159 A1* | 1/2009 | Brownell | ............... | H04L 47/18 370/231 |
| 2016/0342548 A1* | 11/2016 | Hathorn | ............... | G06F 13/4027 |

OTHER PUBLICATIONS

Kung, H. T. et al. "Credit-Based Flow Control for ATM Networks: Credit Update Protocol, Adaptive Credit Allocation, and Statistical Multiplexing," Proc. ACM SIGCOMM '94 Symposium on Communications Architectures, Protocols and Applications, Aug. 31-Sep. 2, 1994, pp. 101-114.

Ozveren et al. "Reliable and efficient hop-by-hop flow control." In Proceedings ACM SIGCOMM, Sep. 1994, pp. 89-100.

* cited by examiner

FACILITATING COMMUNICATION OF DATA PACKETS USING CREDIT-BASED FLOW CONTROL

BACKGROUND

The present disclosure relates in general to link level flow control mechanisms to prevent the loss of packets of data due to buffer overflow by the receiver node of a link. In particular, methods of determining at a transmitter node the availability of a public buffer that is shared by multiple virtual lanes using negative credits are described.

Packets of data that are transmitted from a transmitter node at one end of a link to a receiver node at the other end of the link often need to be stored in a buffer at the receiver to facilitate transmission of the packets and avoid loss of data. Each transmitter node may be associated with a number of virtual lanes over which packets may be sent, and each virtual lane may have a dedicated buffer. The buffers, however, have a defined amount of space available for storing data units that are transmitted in the packets, and once the capacity of a particular buffer has been met, transmission of additional packets via the virtual lane associated with that buffer may be paused until data is released and the buffer again becomes available.

As the demands for data transmission increase, however, it becomes increasingly important to transmit data in a more continuous and more efficient manner, while avoiding errors in transmission and/or loss of data.

BRIEF SUMMARY

Embodiments of the invention described herein therefore provide improved apparatuses and methods for buffering data in a public buffer that is shared among a number of virtual lanes of the transmitter node. In particular, embodiments of the invention provide a mechanism for the transmitter node to keep track of space available for storage of data units in the public buffer among all virtual lanes of the transmitter node by using negative credits to monitor and account for "loans" of credit provided by the public buffer. Moreover, the transmitter node is further configured to allow only a predefined portion of the public buffer to be used by each virtual lane, such that each virtual lane is precluded from obtaining a loan of credits that is more than needed for transmission of the packet.

Accordingly, in some embodiments, an apparatus for managing flow control of data between a transmitter node and a receiver node is provided, where the apparatus includes a transmitter node configured to determine a buffer credit value (TCRi) for each virtual lane of the transmitter node, and the buffer credit value (TCRi) is negative in an instance in which a respective virtual lane private buffer is fully used and at least a portion of a public buffer of the corresponding receiver node is used by the respective virtual lane.

The transmitter node may, in some cases, be further configured to calculate a loan of buffer credit from the corresponding receiver node with respect to the public buffer based on an absolute value of a sum of negative buffer credit values (TCRi) for each virtual lane of the transmitter node. The transmitter node may be configured to determine the amount of the public buffer remaining by subtracting the loan of buffer credit required from a buffer size of the public buffer.

In some embodiments, the transmitter node may be configured to allow transmission of a packet over a corresponding virtual lane if the buffer credit value (TCRi) for the corresponding virtual lane plus an amount of the public buffer remaining is greater than 0. Additionally or alternatively, the transmitter node may be configured to determine the buffer credit value (TCRi) for each virtual lane of the transmitter node by subtracting a Flow Control Total Blocks Sent (FCTBS) from a flow control credit limit (FCCL). Moreover, the transmitter node may be configured to allow transmission of the packet only if the buffer credit value (TCRi) required for transmitting the packet via the corresponding virtual lane plus the amount of data to be buffered over a round trip time (RTT) of transmission of the packet is greater than zero.

In other embodiments, a method of managing flow control of data between a transmitter node and a receiver node is provided, where the method includes determining, in a transmitter node, a buffer credit value (TCRi) for each virtual lane of the transmitter node. The buffer credit value (TCRi) is negative in an instance in which a respective virtual lane private buffer is fully used and at least a portion of a public buffer of the corresponding receiver node is used by the respective virtual lane.

In some cases, the method may further include calculating, in the transmitter node, a loan of buffer credit from the corresponding receiver node with respect to the public buffer based on an absolute value of a sum of negative buffer credit values (TCRi) for each virtual lane of the transmitter node. The amount of the public buffer remaining may be determined in the transmitter node by subtracting the loan of buffer credit required from a buffer size of the public buffer. The method may further include allowing transmission of a packet over a corresponding virtual lane if the buffer credit value (TCRi) for the corresponding virtual lane plus an amount of the public buffer remaining is greater than 0.

The buffer credit value (TCRi) for each virtual lane of the transmitter node may be determined by subtracting a Flow Control Total Blocks Sent (FCTBS) from a flow control credit limit (FCCL). Additionally or alternatively, the loan of buffer credit available from the corresponding receiver node may be calculated by determining, in the transmitter node, whether a loan was made to each respective virtual lane from a public buffer, where a loan is determined to have been made in an instance in which the buffer credit value for the respective virtual lane (TCRi) is less than 0.

Transmission of the packet may be allowed in some embodiments only if the buffer credit value (TCRi) required for transmitting the packet via the corresponding virtual lane plus the amount of data to be buffered over a round trip time (RTT) of transmission of the packet is greater than zero. Moreover, each virtual lane may be allotted a predetermined portion of the public buffer, where transmission of the packet via a particular virtual lane is precluded in an instance in which the buffer credit value (TCRi) for the particular virtual lane is negative and the particular virtual lane has used a respective predetermined portion of the public buffer allotted to the particular virtual lane.

In still other embodiments, an apparatus is provided for managing flow control of data between a transmitter node and a receiver node. The apparatus may include means for determining, in a transmitter node, a buffer credit value (TCRi) for each virtual lane of the transmitter node, wherein the buffer credit value (TCRi) is negative in an instance in which a respective virtual lane private buffer is fully used and at least a portion of a public buffer of the corresponding receiver node is used by the respective virtual lane.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
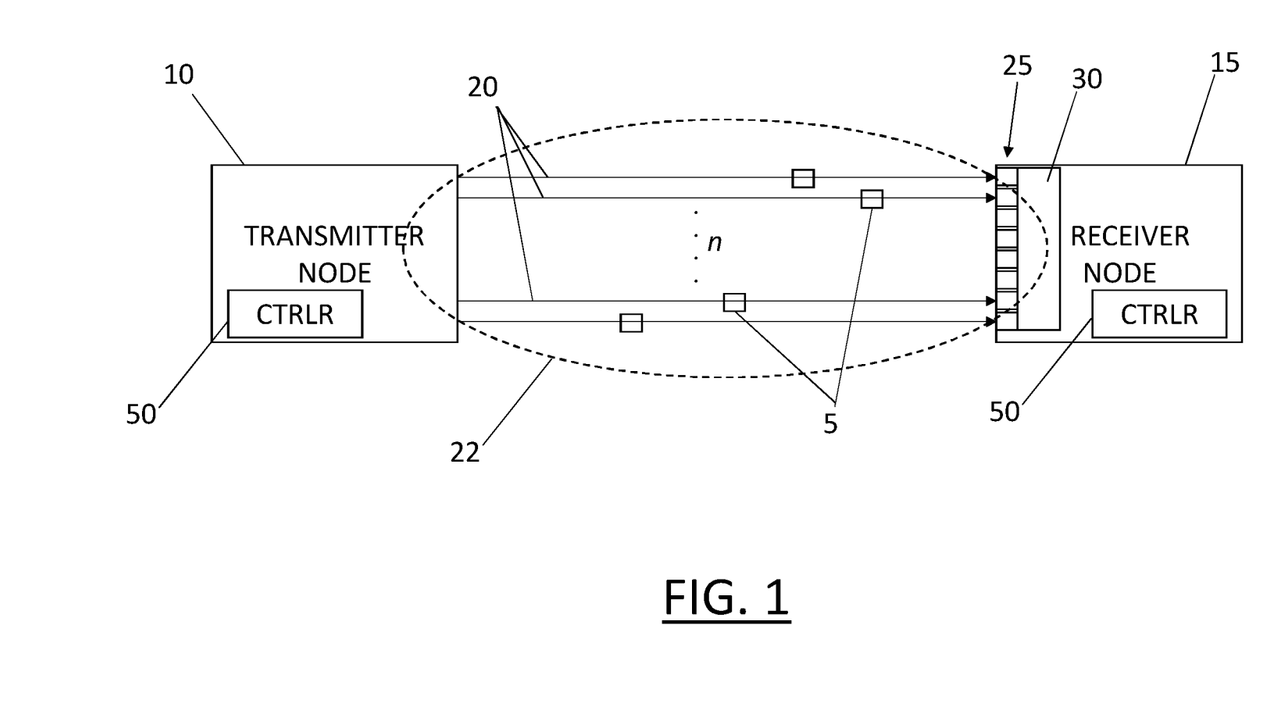
FIG. 1 is a schematic illustration of a physical link with virtual lanes for communicating data between a transmitter node and a receiver node according to an example embodiment.

Packet data communication networks enable connectivity between network elements, such as processor nodes (e.g., servers or computing hosts), input/output peripheral devices (e.g., storage disks and arrays), network switches, routers, and other elements. With reference to FIG. 1, for example, a packets of data 5 may be sent via a link 22 established between one element (e.g., a transmitter node 10) and another element (e.g., a receiver node 15). Thus, the transmitter node 10 may be thought of as the node sourcing data packets, whereas the receiver node 15 may be thought of as the node consuming data packets. It is noted that although FIG. 1 shows a transmitter node 10 that is transmitting data 5 to a receiver node 15 (e.g., uni-directional flow of data), in some embodiments the receiver node 15 is also configured to transmit data to the transmitter node 10, such that both the transmitter node and the receiver node are capable of transmitting and receiving data. In this regard, the transmitter node 10, in some embodiments, may comprise private buffers 25 and/or a public buffer 30, as described below with respect to the receiver node 15. In addition, various components and/or devices of the transmitter node 10, the receiver node 15, and other portions of the physical link 22 may not be shown in FIG. 1 for simplicity and ease of explanation.

With continued reference to FIG. 1, the link comprises a physical link 22, such as an optical fiber or bundle of fibers or copper wires, that connects the two elements 10, 15. The physical link can impose limits on the maximum data rate and the minimum propagation delay, or round trip time (RTT), of the transmission. For example, the RTT of the data transmission may be calculated according to the following equation, in which C equals the speed at which data can travel across the wire (e.g., approximately the speed of light for transmission of an optical signal, or 2*10^8 m/s), and L equals the length of the wire (e.g., 100 m):

$$RTT = 2*L/C$$

The transmitter node 10 and the receiver node 15 may be configured to support the delivery of multiple virtual lanes over a single physical link, such that each physical link may comprise multiple virtual lanes 20 across which the packets 5 may be sent. An example of a communication network standard supporting multiple virtual lanes is the InfiniBand™ standard.

In the example depicted in FIG. 1, n number of virtual lanes 20 are shown. In the process of transmitting a packet 5 from the transmitter node 10 to the corresponding receiver node 15 across a virtual lane 20, at least some of the data may need to be buffered, or temporarily stored, at the receiver node prior to be sent to the destination device. Accordingly, each virtual lane 20 may have a dedicated virtual lane buffer, or "private" buffer 25 associated with it, in which data transmitted in a packet 5 from the respective transmitter node 10 to the corresponding receiver node 15 may be temporarily stored.

According to InfiniBand Architecture (IBA), link-level flow control is used to prevent the loss of packets due to buffer overflow by the receiver (e.g., the private buffer 25). In particular, the IBA uses a credit limit to indicate the total amount of data that the transmitter node 10 has been authorized to send as of link initialization. In this regard, the term "credit" or "block" as used herein refers to a unit of data that uses one credit or allowance of space in the virtual buffer. As a result of errors in transmission, data packets, and flow control information exchange, the flow control state detected by the transmitter node 10 and the receiver node 15 may be inaccurate or inconsistent. Thus, the IBA standards provide for periodic transmissions by the transmitter node 10 to the receiver node 15 of an indication of the total amount of data that the transmitter node has sent since link initialization. In turn, the receiver node 15 uses this data to re-synchronize the state between the receiver node and the transmitter node 10.

For example, 8 virtual lanes (VL) may be provided, and flow control packets may be sent for the virtual lanes 20 at certain predetermined times and as often as necessary to return credits and enable efficient utilization of the link, where the flow control packets are sent using a specific format. The flow control packets may include various fields, such as the Flow Control Total Blocks Sent (FCTBS) and the Flow Control Credit Limit (FCCL). The FCTBS field is generated by the transmitter node 10 (e.g., by logic in a processor associated with the transmitter node) and is calculated for each virtual lane 20 as an indication of the data transmitted since link initialization (time t=0). The FCCL field is generated by the receiver node 15 (e.g., by logic in a processor associated with the receiver node).

According to the IBA and conventional systems, a packet 5 may only be sent from the transmitter node 10 to the receiver node 15 when there is sufficient credit available, such that the amount of data to be transmitted via the packet 5 can be stored in the private buffer 25. The credit (TCR), for example, is calculated by subtracting the FCTBS from the FCCL for the particular virtual lane i, as follows:

$$TCR_i = FCCL_i - FCTBS_i$$

Thus, according to conventional systems and methods, TCRi as calculated in the equation above was required to be >0 in order to allow the transmission. The FCTBSi is incremented by the transmitter node 10 for every block of data transmitted. At the receiver node 15, the available credits for storing blocks in the private buffer (per virtual lane 20) may be represented by RAVAILi, and this number is decreased for every block of data stored in the private buffer for the respective lane. Thus, in an instance in which the RAVAILi becomes 0 (e.g., there is no more space in the particular virtual lane buffer to store additional packets being transmitted), any packet of data 5 that is transmitted via that virtual lane is dropped. In addition, the receiver node 15 keeps track of the Adjusted Blocks Received (ABRi), starting from 0 at time t=0 and continually incrementing an ABR counter to reflect the block of data received from the transmitter node 10 and ingressed to the private buffer 25 for each virtual lane.

Accordingly, in IBA and conventional systems, ABRi (the blocks of data received at the receiver node 15) is equal to FCTBSi (the data transmitted by the transmitter node 10).

At certain times during the transmission of the data, however, blocks of data received at the receiver node 15 and ingressed into the private buffer 25 may be released from the private buffer to be transmitted to a destination device (e.g., a server or switch). In this case, the receiver node 15 would increase RAVAILi for the respective virtual lane to reflect that additional credits are available to the transmitter node 10 for the particular virtual lane due to space being freed up in the respective private buffer 25. The flow control credit limit FCCLi for the virtual lane is calculated by the receiver node 15 using the following equation to take into account the blocks of data received into a particular private buffer 25 of the virtual lane and the available credits remaining for storing blocks of data in the private buffer:

$$FCCLi = ABRi + RAVAILi$$

In some conventional systems, in addition to a private buffer 25 that is provided as a dedicated buffer for each virtual lane 20 as shown in FIG. 1, a shared, or "public," buffer 30 may also be provided that is accessible by any of the n virtual lanes between the given transmitter node 10 and the receiver node 15. In such cases, based on the credit values FCCLi advertised by the receiver node 15, the transmitter node 10 would determine whether to store the transmitted packets 5 of data in the public buffer 30 or in the respective private buffer 25. The transmitter node 10 may, for example, instruct the receiver node 15 to buffer the data in the public buffer 30 if there is sufficient credit associated with the public buffer, but otherwise would instruct the receiver node to store the data in the private buffer 25. A system using both a shared buffer and dedicated buffers for each virtual lane is described in U.S. Pat. No. 8,989,011 titled "Communication over Multiple Virtual Lanes Using a Shared Buffer," filed on Mar. 14, 2013, and issued on Mar. 24, 2015, which is incorporated by reference herein in its entirety.

In such dual-buffer systems, however, it is challenging to provide a mechanism for the receiver node 15 to advertise to the transmitter node 10 a credit value associated with the public buffer 30 so as to allow the transmitter node to determine whether packets 5 should be transmitted and/or where to store the packets (e.g., in the shared buffer or the dedicated virtual lane buffer). For example, the IBA does not take into account the existence of a shared buffer, but only provides mechanisms for providing flow control information with respect to credits available in the dedicated virtual lane buffers. Thus, efforts to transmit flow control information indicating a credit value associated with a shared buffer according to conventional systems have, in some cases, contradicted specific formatting or transmission requirements as dictated in the standards provided by governing bodies such as the IBA.

Accordingly, there is a need to provide information regarding space available in a public buffer that is shared among virtual lanes of a physical link between a transmitter node and a receiver node that makes use of existing architecture and standards, such as the IBA, and at the same time does not require the transmitter node 10 to instruct the receiver node 15 as to which buffer (public or private) the packets are to be stored.

In Ethernet network architectures, for example, there is support for standard format packets that have 3 bits of Prio in the VLAN header; however, there are not extra bits available for information regarding a public buffer when, for example, 8 priorities are used. Similarly, with respect to InifiniBand architectures, there is support for standard format packets that have 4 bits of virtual lanes; however, VL15 is reserved and is excluded from flow control information (as described above), and other fields that are not virtual lane fields are considered "invariant" fields that are protected by invariant data relating to mechanisms for protecting data (e.g., cyclic redundancy check (CRC)). Thus, there is no way to provide information regarding the public buffer when 8 or more of the virtual lanes are used under the IBA. Moreover, even in a case in which the public buffer has a size large enough for allowing full-wire speed for more than 1 virtual lane, there are currently no mechanisms to stop a particular virtual lane from utilizing the whole public buffer (e.g., for storing transmissions of multiple packets).

Accordingly, embodiments of the invention described herein therefore provide methods and apparatuses that allow a transmitter node to receive information regarding the availability of a public buffer within existing network architectures and transmission protocols through the use of negative credits. In addition, embodiments of the invention also allow the transmitter node to know the needed buffer size per virtual lane for transmitting a packet in advance based on the round trip time (RTT) and maximum transmission unit (MTU) for the packet.

As described in greater detail below, for example, the transmitter node 10 (shown in FIG. 1) may be configured to calculate a "loan" of credits for each virtual lane, where the load represents credits that are not available from the respective private buffers, but are instead provided due to availability of the public buffer. If the sum of the loans is smaller than the public buffer, then the loan may be carried out by allowing the transmission to take place and the transmitted packets to be stored in the public buffer when received at the receiver node 15. The receiver node 15 may in turn be configured to increment the ABRi for each virtual lane for the received packets.

According to embodiments of the invention, the value of RAVAILi will become negative when received packets at the receiver node 15 go to the public buffer. As a result, because the credit values reflected in FCCLi are equal to ABRi+RAVAILi, the value of FCCLi will become lower than ABRi, thus producing negative credits. On the transmit side, when the flow control credit limit FCCLi is smaller than the value of the data transmitted by the transmitter node 10 FCTBSi (which is equivalent to saying that the credit TCRi is negative), the transmitter node will know that the credits are negative.

In addition, according to embodiments of the invention described herein, the transmitter node 10 may be configured to know the needed buffer size per virtual lane in advance of the transmission of the packet 5, such as by calculating the RTT (as described above) and the MTU, which may have been configured by the user or an application. Thus, embodiments of the invention allow the transmitter node 10 to check that each virtual lane will not consume more credits from the loan provided by the public buffer than needed to assure full bandwidth usage.

A method of managing flow control of data is therefore provided, where the method comprises determining, in a transmitter node, a buffer credit value (TCRi) for each virtual lane of the transmitter node. Notably, the buffer credit value (TCRi) according to embodiments of the invention is negative (e.g., has a value less than 0) in an instance in which a respective virtual lane private buffer is fully used (e.g., no credits remain with respect to the virtual lane private buffer), and at least a portion of the public buffer of the corresponding receiver node has been used by the respective virtual lane. In other words, the indication of a negative buffer credit value (TCRi) according to embodiments of the invention reflects a loan of credits from the public buffer, because the transmitter node 10 has transmitted more data than can be stored in the respective private buffer.

Determining the buffer credit value (TCRi) for each virtual lane of the transmitter node may, for example, comprise subtracting a Flow Control Total Blocks Sent (FCTBS) from a Flow Control Credit Limit (FCCL), as follows:

$$TCRi=FCCLi-FCTBSi$$

As noted above, the FCCLi is received at the transmitter node from the receiver node, and the buffer credit value (TCRi) will thus be negative when the FCTBSi (reflecting the blocks of data sent) is greater than the FCCLi (reflecting the available credits in the private buffer) for each virtual lane. It is noted that in some cases, the value of FCCLi may also reflect negative credits, such as in an instance in which the transmitter node 10 has already used 10 negative credits (as an example). In this example, the FCCLi would be negative (e.g., $-10$), and thus the credit reflected by the value of TCRi as calculated above would also grow to a larger negative number, indicating a larger loan of credits from the public buffer.

Figure 2:
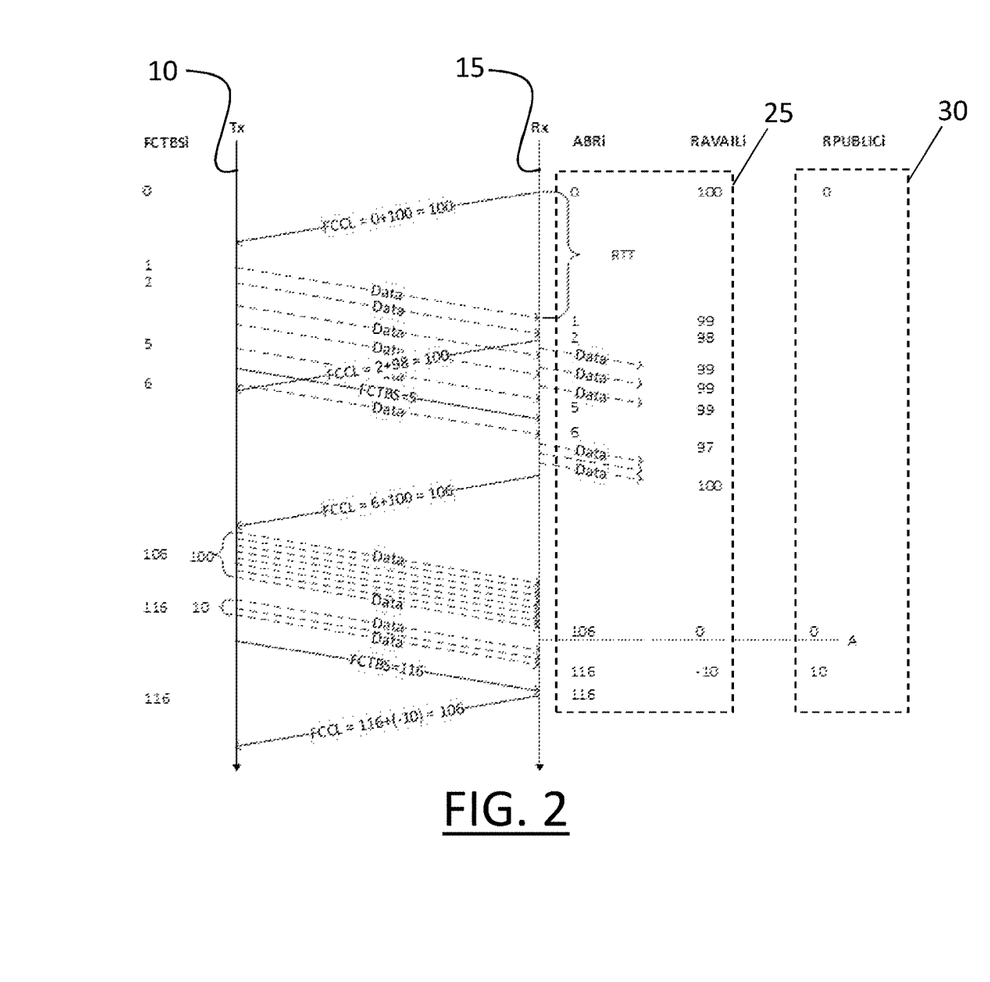
FIG. 2 is a schematic illustration of the transmission of data packets and flow control data between a transmitter node and a receiver node according to an example embodiment.

An example is illustrated in FIG. 2, which shows the transmission of packets of data and flow control information between a transmitter node 10 and a receiver node 15. Starting at time t=0, represented by the top of the lines Tx (transmitter node 10) and Rx (receiver node 15), the ABRi (for a particular virtual lane) is 0, as no packets have yet been received into the virtual lane private buffer 25. Assuming a block size of 100 for the private buffer 25 of each lane, RAVAILi (which is at the starting time unused) is thus 100, as shown. The public buffer 30 is also unused at this time, and thus RPUBLICi, which is reflective of the blocks used in the public buffer, has a value of 0.

The FCCLi transmitted by the receiver node 15 to the transmitter node 10 at link initialization is thus ABRi+RAVAILi=0+100=100.

As packets (represented in FIG. 2 by dashed lines of "data") begin to be transmitted, ABRi is incremented as shown, from 0 to 1 to 2, etc., as data is ingressed into the private buffer 25. The value of RAVAILi is correspondingly decreased as blocks of the private buffer 25 are used by the ingressed data packets, from 100 to 99 to 98, etc. As data is removed from the private buffer (depicted as dashed line arrows within the private buffer 25), RAVAILi is adjusted accordingly. The receiver node 15 may send further flow control information, such as when 2 packets have been ingressed into the private buffer and none have yet been released (FCCLi=2+98=100) and later, when 6 packets of data have been ingressed into the private buffer 25 and 6 packets have been released, such that FCCLi=6+100=106.

At this point, the buffer credit value (TCRi) for the depicted virtual lane may be equal to TCRi=FCCLi-FCTBSi=106-6=100, indicating that all of the blocks in the private buffer 25 are available. As time progresses, 100 additional packets may be transmitted from the transmitter node 10 to the receiver node 15, as shown, and the FCTBSi may thus increase from 6 units of data transmitted to 106. At that point (labeled A in FIG. 2), the ABRi may reflect that 106 blocks have been ingressed into the private buffer (6 of them having previously been released), and there may be 0 blocks of the original 100 blocks remaining available in the private buffer 25, as indicated by RAVAILi=0. Thus, at this point A, there is no space left in the private buffer 25; however, none of the space in the public buffer 30 has been used (RPUBLICi=0).

After transmission of 10 additional packets from the transmitter node 10 to the receiver node 15, the transmitter node may communicate an updated FCTBS of 116, reflecting 116 blocks of data sent (increased from 106). Because there is no space left in the private buffer 25, these additional 10 packets may be stored in the public buffer 30. Thus, ABRi is incremented to 116; RAVAILi shows a negative credit value of $-10$, and RPUBLICi shows 10 blocks used in the public buffer 30. In this case, FCCLi=116+($-10$)=106, and as a result, the buffer credit value (TCRi) for the depicted virtual lane may be equal to TCRi=FCCLi-FCTBSi=106-116=$-10$, which is a negative value reflecting usage of the public buffer 30 (e.g., a "loan" of credits from the public buffer).

Accordingly, embodiments of the method may thus comprises calculating, in the transmitter node, a loan of buffer credit from the corresponding receiver node with respect to the public buffer based on an absolute value of a sum of negative buffer credit values (TCRi) for each virtual lane of the transmitter node, such as follows:

$$TLOANi=\text{if }(TCRi<0)\text{: absolute value of }TCRi\text{; else } 0$$

$$TLOAN=\text{Sum of }TLOANi\text{ for all virtual lanes}$$

The amount of the public buffer remaining (TPUBLICAVAIL) may thus be determined by subtracting the loan of buffer credit required from a buffer size of the public buffer, which is known by the transmitter node, as follows:

$$TPUBLICAVAIL=TPUBLIC-TLOAN$$

Accordingly, embodiments of the method would allow transmission of a subsequent packet of data over a corresponding virtual lane if the buffer credit value (TCRi) for the corresponding virtual lane plus an amount of the public buffer remaining is greater than 0, indicating that there is available space for storing packets in the public buffer, as follows:

$$TCRi+TPUBLICAVAIL>0$$

Thus, in some embodiments, calculating the loan of buffer credit available from the corresponding receiver node may comprise determining, in the transmitter node, whether a loan was made to each respective virtual lane from a public buffer, where the loan is determined to have been made in an instance in which the buffer credit value TCRi for the respective virtual lane is less than 0.

In some cases, transmission of the packet may be allowed only if the buffer credit value TCRi required for transmitting the packet via the corresponding virtual lane is less than or equal to the amount of data to be buffered over a round trip time RTT of transmission of the packet. Thus, transmission of the packet in such cases would be allowed if the following two criteria are satisfied:

$$TCRi+TPUBLICAVAIL>0 \text{ AND}$$

$$TCRi+RTT>0$$

As a result, a given virtual lane will not be able to transmit further packets of data in the event that it reaches its RTT, so as not to consume more credits than it is allotted with respect to the needs of other virtual lanes. Thus, each virtual lane may be allotted a predetermined portion of the public buffer (e.g., 20%), and transmission of the packet via a particular virtual lane may be precluded in an instance in which the buffer credit value TCRi for the particular virtual lane is negative and the particular virtual lane has used a respective predetermined portion of the public buffer allotted to the particular virtual lane.

For example, consider a case in which the public buffer can hold 100 units, a private buffer of a virtual lane can hold 10 units, the transmitter node 10 (shown in FIG. 1) has 8 virtual lanes 20 (e.g., n=8), and the RTT of the link requires 60 units of available buffer space. In this example case, a first virtual lane 20 may consume up to 50 units of the public buffer, because it first consumes 10 units from its own private buffer 25 and needs only 50 more units from the public buffer 30 to achieve the requisite RTT buffer space of 60 units. At this point, each of the other virtual lanes may still have their own private buffer space available of 10 units, plus there are 50 units of public buffer space remaining. Without embodiments of the invention that allow transmission only if TCRi+RTT>0, the first virtual lane 20 may have been allowed to use all 100 units of the public buffer 30 (e.g., by transmitting additional data), which would have limited all of the other virtual lanes to having only 10 units of buffering space (from their respective private buffers 25) available, which would effectively decrease the bandwidth of those virtual lanes to 10/60, or 16% of their maximum bandwidth.

Embodiments of the methods and systems described above can be implemented in various ways in various types of networking environments. For example, with reference to FIG. 1, each of the transmitter node 10 and/or the receiver node 15 may include a controller 50 configured to implement embodiments of the invention described herein. The controller 50 may be any means such as a device or dedicated circuitry embodied in either hardware or a combination of hardware and software that is configured to receive and/or transmit data between the transmitter node 10 and the receiver node 15 and/or to manage flow control of the data between the transmitter node and the receiver node by providing the functionalities described herein.

The controller 50 may be embodied in a number of different ways. For example, the controller 50 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. The controller 50 may be in communication with a memory that is configured to store information, data, content, instructions, or the like for enabling the apparatus and/or system to carry out various functions in accordance with an example embodiment of the present invention. For example, the memory may comprise one or both of the private buffer 25 and the public buffer 30.

For example, the apparatus in some cases may be embodied in the transmitter node 10, which may include the controller 50, in communication with the memory (e.g., the private buffer 25 and/or the public buffer 30), and may be configured to perform the calculations, cause transmission of packets of data, and receive and/or cause transmission of flow control information as described above with respect to FIGS. 1 and 2. In other cases, the apparatus 50 may be embodied by the receiver node 15, and the controller 50, in communication with the memory (e.g., the private buffer 25 and/or the public buffer 30), may be configured to keep track of and increment values regarding data ingressed into the private and/or public buffer and may further be configured to receive and/or cause transmission of flow control information as described above with respect to FIGS. 1 and 2.

Figure 3:
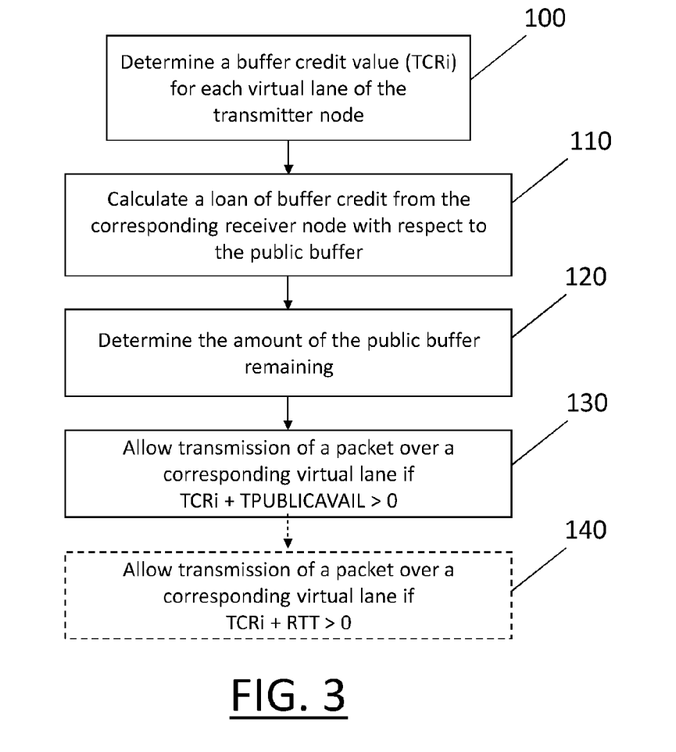
FIG. 3 is a flow chart illustrating a method for managing flow control of data between a transmitter node and a receiver node according to an example embodiment of the present invention.

With reference to FIG. 3, in some embodiments, a method 100 for managing flow control between a transmitter node and a receiver node is provided. According to embodiments of the method, a buffer credit value (TCRi) for each virtual lane of the transmitter node is determined at Block 100, wherein the buffer credit value (TCRi) is negative in an instance in which a respective virtual lane private buffer is fully used and at least a portion of a public buffer of the corresponding receiver node is used by the respective virtual lane, as described above. A loan of buffer credit from the corresponding receiver node with respect to the public buffer may be calculated based on an absolute value of a sum of negative buffer credit values (TCRi) for each virtual lane of the transmitter node at Block 110. As described above, the amount of the public buffer remaining may be determined by subtracting the loan of buffer credit required from a buffer size of the public buffer at Block 120.

At Block 130, transmission of a packet over a corresponding virtual lane may be allowed if the buffer credit value (TCRi) for the corresponding virtual lane plus an amount of the public buffer remaining is greater than 0. Additionally, transmission of the packet may only be allowed if the buffer credit value (TCRi) plus the amount of data to be buffered over a round trip time (RTT) of transmission of the packet is greater than 0, at Block 140. In this way, if TCRi is negative (the virtual lane has taken a loan), then a further loan that is greater than RTT cannot be taken.

Example embodiments of the present invention have been described above with reference to block diagrams and flowchart illustrations of methods and apparatuses. In some embodiments, certain ones of the operations above may be modified or further amplified as described below. Furthermore, in some embodiments, additional optional operations may be included. Modifications, additions, or amplifications to the operations above may be performed in any order and in any combination.

In an example embodiment, an apparatus for performing the methods of FIG. 3 above may comprise a transmitter node 10 and/or a controller 50 (FIG. 1) configured to perform some or each of the operations (100-140) described above. The transmitter node may, for example, be configured to perform the operations (100-140) by performing hardware implemented logical functions, executing stored instructions, or executing algorithms for performing each of the operations.

It will be understood that each operation, action, step and/or other types of functions shown in the diagram (FIG. 3), and/or combinations of functions in the diagram and/or described herein, can be implemented by various means. For example, the apparatus may comprise means for performing each of the operations described above. In this regard, according to an example embodiment, examples of means for performing operations 100-140 may comprise, for example, the controller 50 and/or a device or dedicated circuitry for performing the operations as described above.

Many modifications and other embodiments of the inventions set forth herein will come to mind to one skilled in the art to which these inventions pertain having the benefit of the teachings presented in the foregoing descriptions and the associated drawings. Although the figures only show simplified representations of a transmitter node, a receiver node, and the physical link with virtual lanes as described herein, it is understood that the particular configurations, components, and representations are for the purposes of explanation, and embodiments of the invention may be implemented with respect to various other types of network architectures and protocols. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for managing flow control of data between a transmitter node and a receiver node, the apparatus comprising:
   a transmitter node configured to transmit data packets via one or more virtual lanes to a receiver node,
   one or more private buffers, wherein each private buffer is associated a respective virtual lane and is configured to store the data packets, and
   a public buffer associated with the receiver node, wherein the public buffer is accessible by any of the one or more virtual lanes and is configured to store the data packets,
   wherein the transmitter node is configured to determine a buffer credit value (TCRi) for each virtual lane of the transmitter node by subtracting a Flow Control Total Blocks Sent (FCTBS) from a Flow Control Credit Limit (FCCL) of the respective virtual lane, and
   wherein the buffer credit value (TCRi) is negative in an instance in which the respective virtual lane private buffer is fully used and at least a portion of the public buffer of the corresponding receiver node is used by the respective virtual lane.

2. The apparatus of claim 1, wherein the transmitter node is further configured to calculate a loan of buffer credit from the corresponding receiver node with respect to the public buffer by calculating an absolute value of a sum of negative buffer credit values (TCRi) for each virtual lane of the transmitter node.

3. The apparatus of claim 2, wherein the transmitter node is configured to determine the amount of the public buffer remaining by subtracting the loan of buffer credit required from a buffer size of the public buffer.

4. The apparatus of claim 1, wherein the transmitter node is configured to allow transmission of a packet over a corresponding virtual lane if the buffer credit value (TCRi) for the corresponding virtual lane plus an amount of the public buffer remaining is greater than 0.

5. The apparatus of claim 1, wherein the transmitter node is configured allow transmission of the packet only if the buffer credit value (TCRi) required for transmitting the packet via the corresponding virtual lane plus the amount of data to be buffered over a round trip time (RTT) of transmission of the packet is greater than zero.

6. A method of managing flow control of data between a transmitter node and a receiver node, the method comprising:
   determining, in a transmitter node, a buffer credit value (TCRi) for each virtual lane of the transmitter node by subtracting a Flow Control Total Blocks Sent (FCTBS) from a Flow Control Credit Limit (FCCL) of a respective virtual lane,
   wherein the transmitter node is configured to transmit data packets via one or more of the virtual lanes to a receiver node,
   wherein each virtual lane is associated with a private buffer, wherein each private buffer is configured to store the data packets,
   wherein the receiver node is associated with a public buffer, wherein the public buffer is accessible by any of the one or more virtual lanes and is configured to store the data packets, and
   wherein the buffer credit value (TCRi) is negative in an instance in which a respective virtual lane private buffer is fully used and at least a portion of a public buffer of the corresponding receiver node is used by the respective virtual lane.

7. The method of claim 6 further comprising calculating, in the transmitter node, a loan of buffer credit from the corresponding receiver node with respect to the public buffer by calculating an absolute value of a sum of negative buffer credit values (TCRi) for each virtual lane of the transmitter node.

8. The method of claim 7 further comprising determining, in the transmitter node, the amount of the public buffer remaining by subtracting the loan of buffer credit required from a buffer size of the public buffer.

9. The method of claim 6 further comprising allowing transmission of a packet over a corresponding virtual lane if the buffer credit value (TCRi) for the corresponding virtual lane plus an amount of the public buffer remaining is greater than 0.

10. The method of claim 6, wherein calculating the loan of buffer credit available from the corresponding receiver node comprises determining, in the transmitter node, whether a loan was made to each respective virtual lane from a public buffer, wherein a loan is determined to have been made in an instance in which the buffer credit value for the respective virtual lane (TCRi) is less than 0.

11. The method of claim 6, wherein transmission of the packet is allowed only if the buffer credit value (TCRi) required for transmitting the packet via the corresponding virtual lane plus the amount of data to be buffered over a round trip time (RTT) of transmission of the packet is greater than zero.

12. The method of claim 6, wherein each virtual lane is allotted a predetermined portion of the public buffer, and wherein transmission of the packet via a particular virtual lane is precluded in an instance in which the buffer credit value (TCRi) for the particular virtual lane is negative and the particular virtual lane has used a respective predetermined portion of the public buffer allotted to the particular virtual lane.

13. An apparatus for managing flow control of data between a transmitter node and a receiver node, the apparatus comprising:
   means for determining, in a transmitter node, a buffer credit value (TCRi) for each virtual lane of the transmitter node by subtracting a Flow Control Total Blocks Sent (FCTBS) from a Flow Control Credit Limit (FCCL) of the respective virtual lane, wherein the transmitter node is configured to transmit data packets via one or more of the virtual lanes to a receiver node, wherein each virtual lane is associated with a private buffer, wherein each private buffer is configured to store the data packets, wherein the receiver node is associated with a public buffer, wherein the public buffer is accessible by any of the one or more virtual lanes and is configured to store the data packets, and wherein the buffer credit value (TCRi) is negative in an instance in which a respective virtual lane private buffer is fully used and at least a portion of a public buffer of the corresponding receiver node is used by the respective virtual lane.

14. The apparatus of claim 13 further comprising means for calculating a loan of buffer credit from the corresponding receiver node with respect to the public buffer by calculating an absolute value of a sum of negative buffer credit values (TCRi) for each virtual lane of the transmitter node.

15. The apparatus of claim 14 further comprising means for determining the amount of the public buffer remaining by subtracting the loan of buffer credit required from a buffer size of the public buffer.

16. The apparatus of claim 13 further comprising program code instructions for allowing transmission of a packet over a corresponding virtual lane if the buffer credit value (TCRi) for the corresponding virtual lane plus an amount of the public buffer remaining is greater than 0.

17. The apparatus of claim 13, wherein transmission of the packet is allowed only if the buffer credit value (TCRi) required for transmitting the packet via the corresponding virtual lane plus the amount of data to be buffered over a round trip time (RTT) of transmission of the packet is greater than zero.

* * * * *